United States Patent [19]

Abe et al.

[11] 4,035,933

[45] July 19, 1977

[54] RESPONSE ANALYZING DEVICE

[75] Inventors: Kiyomi Abe, Noda; Genichi Tagata, Hamamatsu, both of Japan

[73] Assignee: Pentel Kabushiki Kaisha, Japan

[21] Appl. No.: 415,833

[22] Filed: Nov. 14, 1973

[30] Foreign Application Priority Data

| | | |
|---|---|---|
| Apr. 12, 1973 | Japan | 48-41650 |
| June 4, 1973 | Japan | 48-62691 |

[51] Int. Cl.² .......... G09B 5/00

[52] U.S. Cl. .......... 35/48 R

[58] Field of Search .......... 35/5, 6, 9 R, 9 A, 8 R, 35/48 R; 179/1 B, 1 MN, 2 AS; 235/51, 52; 325/31

[56] References Cited

U.S. PATENT DOCUMENTS

| | | | |
|---|---|---|---|
| 3,126,513 | 3/1964 | Kamen | 325/31 |
| 3,190,014 | 6/1965 | Rhodes | 35/48 R |
| 3,300,876 | 1/1967 | Johannsen | 35/48 R |
| 3,378,937 | 4/1968 | Warren | 35/9 R |
| 3,416,243 | 12/1968 | Greenberg et al. | 35/48 R |
| 3,503,296 | 3/1970 | Schmoyer et al. | 35/6 |
| 3,631,612 | 1/1972 | Westerberg | 35/48 R |
| 3,647,926 | 3/1972 | Rohloff et al. | 35/48 R |
| 3,676,939 | 7/1972 | Oberst et al. | 35/48 R |

*Primary Examiner*—Richard C. Pinkham
*Assistant Examiner*—Vance Y. Hum
*Attorney, Agent, or Firm*—Robert E. Burns; Emmanuel J. Lobato; Bruce L. Adams

[57] ABSTRACT

A response analyzing device comprises a discriminating device and a plurality of answering devices connected in parallel to a plurality of lines extending from the discriminating device. Each of the answering devices are provided with resonance circuits having mutually different resonance frequencies and a selective switch for connecting the resonance circuits with these lines. The discriminating device is provided with a sweep oscillator for impressing outputs to these lines and has a variable range which permits the sweeping of the entire range of the resonance frequencies and circuitry for detecting the variation in impedance due to the resonance phenomenon created in the resonance circuit.

9 Claims, 21 Drawing Figures

RESPONSE ANALYZING DEVICE

This invention relates to a response analyzing device, and more particularly to an analyzing device for use in adding votes, measurement of educational effects and other applications of this sort.

The simplest method for many responders to discriminate or select their desired answers among the preexemplified answers to a question asked is to ask the responders to raise their hands, when the answer given is considered to be correct for them. According to such a method, there can be obtained two types of information, one being the number of responders per each exemplified answer or the ratio of the number of the specific responders to the total number of the responders present, and the other one being the names of the responders selecting a specific exemplified answer. In the case of voting in some type of conference, it is only necessary to discriminate the number of approvers, while in the case of school education, it may be of importance to find who has selected the specific exemplified answer. In either case, however, satisfactory reliability may not result, because one responder would be psychologically affected by the other.

Under these circumstances, there has been proposed a method, wherein each responder is provided with an answering device with selective switches in lieu of raising their hands. With this method, there is provided a so-called parent device, i.e., discriminating device for discriminating between responders, such that the results of the operation of selective switches by each responder are electrically indicated on a discriminating device. As a result, only the interviewer i.e., the person who gives a question can be informed of the resultts of a question, without notifying responders of their answers among them. According to the primitive response-analyzing device, such as has been disclosed in Japanese Pat. Publication No. 5452/59, there are provided in each answering device a plurality of resistors, to which are connected selective switches in parallel, whereby one of a plurality of resistors may be opened or closed, such that the number of responders of interest may be notified from the variation in the voltage in a circuit which is caused due to the variation in combined resistance accruing therefrom. According to the device described, one answer is selected from two alternatives by ON-OFF operation of a selective switch. Recently, a method has been proposed which permits selection of one answer among more than two exemplified answers and utilizes the variation in combined resistance. So-called a multi-branch-selective-type response analyzing device is typically given in the Japanese Pat. Publication No. 20283/70, in which the variation in combined resistance resulting from the actuation of the selective switches in answering devices may be detected as the variation in an electric current. In an attempt to discriminate and identify the responders per selective branch, this device incorporates individual-responder discriminating lamps within the discriminating device, and such lamps had not been proposed before the advent of such a device. Accordingly, there are provided in the discriminating device the indicating lamps which are adapted to be lit, when the selective switch in the answering device is brought into operative condition, and such lamps are allotted to the respective responder.

However, conventional response analyzing devices using the variation in resistance suffer from disadvantages in that there result complications in constructions of devices, because electric wires have to be connected between the discriminating device and the respective responder, thereby failing to provide a portable handy device. Another disadvantage of the multi-branch selecting system is that, because of the increase in the number of electric wires, the cost of such wires is no longer negligible, thus presenting a costly device. Furthermore, for obtaining accurate information, there arises the need to provide accessories, such as a constant voltage source, for means to detect the variation in electric current.

It is a principal object of the invention to provide a response analyzing device consisting of a discriminating device and a plurality of answering devices, said discriminating device being connected with a single answering device which is in turn bridge-connected with the other answering devices, rather than said discriminating device being connected to each answering device, directly and separately.

It is a further object of the invention to provide a response analyzing device which permits the connection by means of two lines between a discriminating device and an answering device or between the answering devices, mutually.

It is a still further object of the invention to provide a response analyzing device which provides stable operation and accurate information.

According to the present invention, there is provided a response analyzing device, wherein the output from a sweep oscillator is impressed from the discriminating device to each of a plurality of answering devices which are provided with resonance circuits having resonance frequencies different from each other, whereby said discriminating device may detect the variation in impedance caused by resonance phenomenon in said answering devices.

According to the present invention, since each of the answering devices has a respective resonance circuit having mutually different resonance frequencies, if the output from a sweep oscillator having a variable range, which can sweep over the entire range of said resonance frequencies, is impressed to the answering devices, then each of said resonance frequencies and sweep frequencies will cause resonance phenomena at different times relative to each other, whereby the discriminating device may detect the electrical variation caused at the time of the aforesaid resonances.

The response analyzing device according to the invention permits the bridge connection among answering devices by using standard wires minimized in the number of lines, thereby presenting a portable means rather than fixing the device in position, rigidly.

These and other features and objects of the invention will be made clear from reading the ensuing part of the specification with reference to the accompanyingg drawings, in which.

Figure 1:
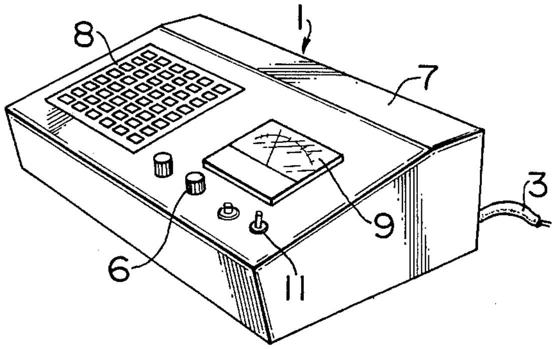
FIG. 1 is a perspective view of one example of a discriminating device of a response analyzing device of the invention.
Figure 2:
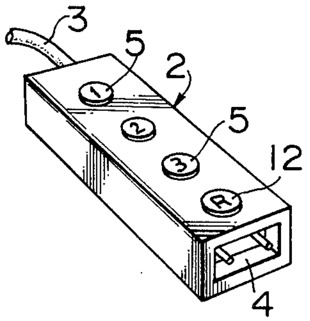
FIG. 2 is a perspective view of a preferred answering device suited for use in the discriminating device of FIG. 1.

Referring to FIGs. 1 and 2, the response analyzing device of the present invention includes a discriminating device or master unit 1 positioned at an interviewer's position and answering devices 2 allotted to responders, respectively. The discriminating device 1 is connected with a wire 3 to an answering device. However, according to the present invention, each answering device need not be connected with the discriminating device 1, individually, but one answering device 2 connected to the discriminating device 1 is further bridge-connected with the other answering devices. For this purpose, plug sockets 4 are provided on the opposite sides of an answering device 2 and thereby the answering device is readily connected to the other answering devices by using plugs having standard wires (not shown).

The discriminating device 1 and the answering device 2 are provided as being a multi-branch type device. Accordingly, the answering device 2 is provided with three channel selective switch buttons 5, as an example, while the discriminating device 1 is provided with knobs 6 for use with channel switches. The discriminating device 1 is provided with a plurality of individual-responder discriminating lamps 8 allotted to each responder and provided on the outer surface of a case 7, and with an indicator 9 adapted to indicate the number of responders per channel. Also provided on the case 7 is a knob 11 providing for an electric power source. The answering device 2 is provided with a plurality of selective switch push buttons 5 and a rest button 12 which is adapted to reset the actuated selective switch button 5 mechanically.

Thus, the responders may select among three exemplified answers to the question asked by the interviewer, by pushing the selective switch button 5 for the corresponding channel. When the interviewer selects among the channels providing responder information regarding exemplified answers by using switching knob 6, then he can identify who selects the specific channel, by means of the individual-responder discriminating lamp 8 lit, or he may be informed of the number of the responders by means of the value indicated on an indicator 9. Furthermore, he can obtain such informations regarding the other channels by using channel switching knobs 6, respectively.

Figure 3:
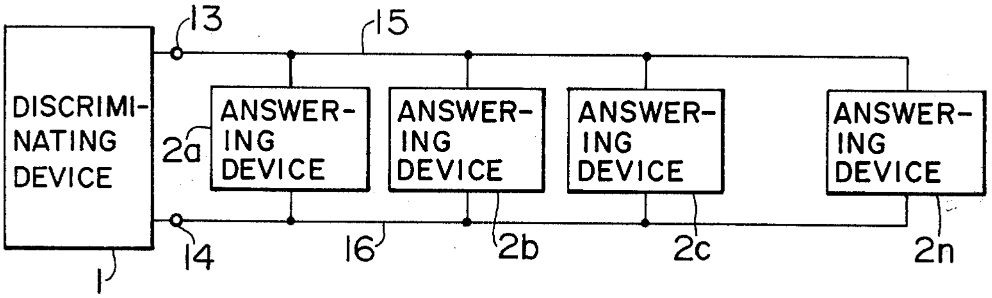
FIG. 3 is a block diagram of the response analyzing device of the present invention.

FIG. 3 is a block diagram showing the entire construction of the response analyzing device according to the invention. In this instance, a plurality of answering devices 2a, 2b, 2c . . . 2n (n is an arbitrary number) are connected in parallel between the two lines extending from a pair of terminals of the discriminating device 1. Accordingly, as has been described, one answering device 2a may be connected with the discriminating device 1 and at the same time the answering device 2a may be bridge-connected in parallel with the other answering devices 2b, 2c . . . 2n.

Figure 4:
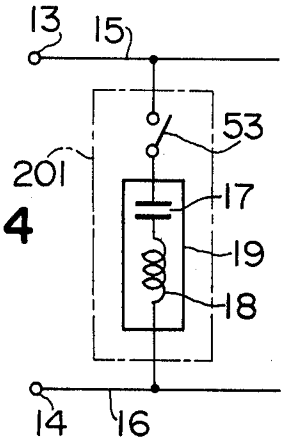
FIG. 4 is a circuit diagram showing one example of the answering device shown in FIG. 3.

FIG. 4 shows an answering device 201 of the present invention which permits the selection among two alternatives. The answering device 201 is provided with a series connected circuit 19 consisting of a condensor 17 and an inductance 18 connected between the two lines 15 and 16 extending from the terminals 13 and 14, said device 201 being further provided with a selective switch 53. In this respect, a single answering device is shown in the drawing, but the other answering devices are constructed in the same manner. It should be noted however that the resonance frequencies of the answering devices 201 are different from each other. This is the most prominent feature of the invention and hence should be borne in mind, coupled with the sweep frequency which will be described hereinafter with reference to the description of the discriminating device of FIG. 5.

Figure 5:
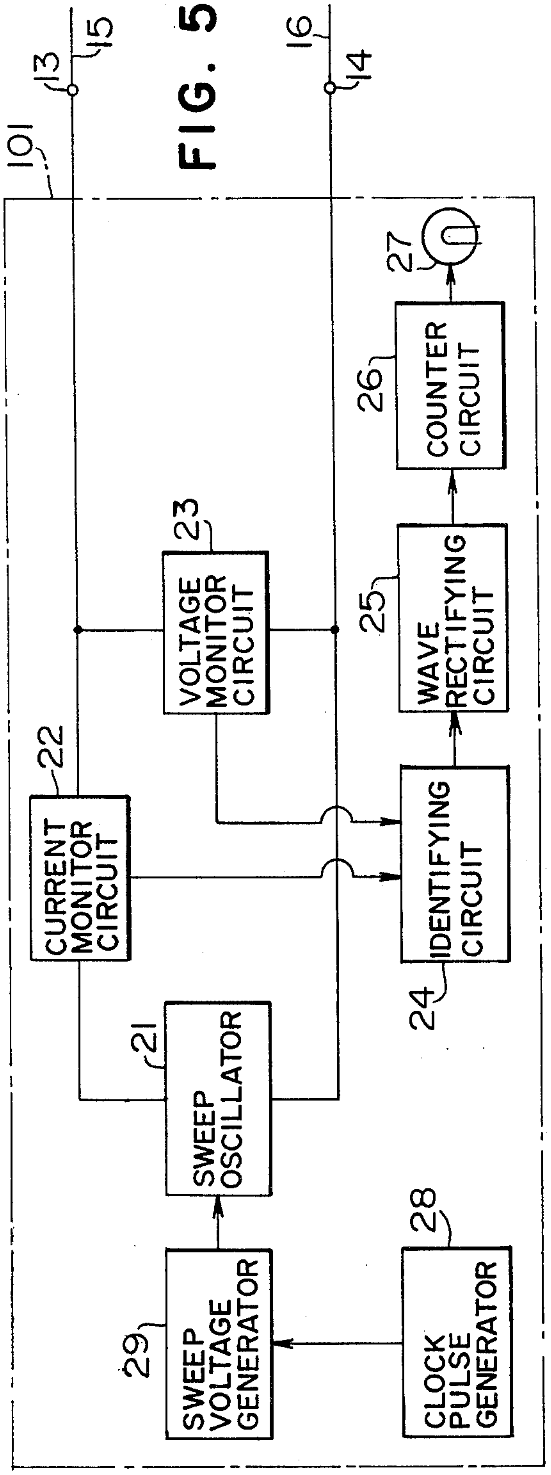
FIG. 5 is a block diagram showing another example of the discriminating device shown in FIG. 3.
Figure 6A:
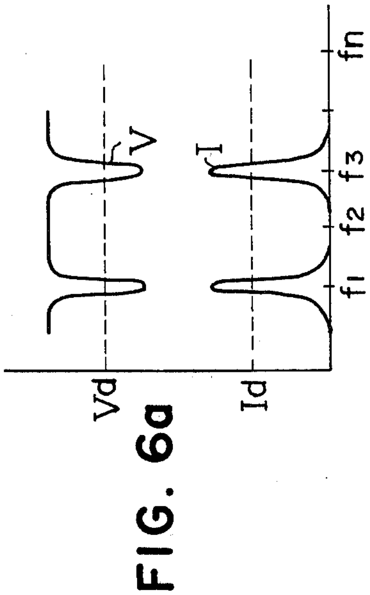
FIG. 6a is a plot illustrating the variations in electric current and voltage.
Figure 6B:
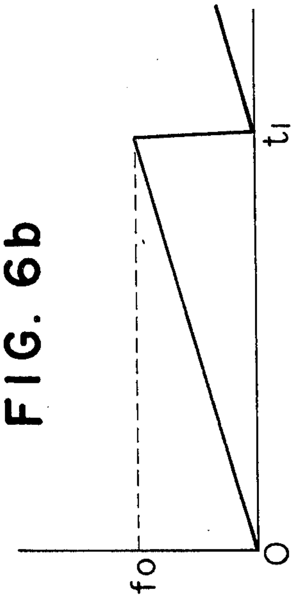
FIG. 6b is a plot showing the output frequency of a sweep oscillator.

FIG. 5 shows the discriminating device 101 for use with the answering devices 201 shown in FIG. 4. The discriminating device is provided with a sweep oscillator 21 having a variable range adapted to sweep over the entire range of resonance frequencies which are different from each other and allotted to a plurality of answering devices 201, respectively. The output from the sweep frequency oscillator 21 is fed through the terminals 13 and 14 to the lines 15 and 16. Accordingly, when any one of the selective switches 53 for the plurality of answering devices 201 is in an operative condition, the resonance of the sweep oscillator 21 having a frequency in coincidence with the resonance frequency of the resonance circuit 19 will cause the variation in impedances in the lines 15 and 16. It may be understood accordingly that there will result a variation in electric current flowing through the lines 15 and 16 or in the voltage impressed to the terminals 13 and 14. As shown in FIG. 6, indicated along the abscissa are resonance frequencies $f_1, f_2, f_3 \ldots f_n$ of the respective answering device 201. When their resonance frequencies coincide with the sweep frequency, for instance, when the resonance frequencies $f_1$ and $f_3$ coincide with the sweep frequency, then the values of electric current 1 and voltage V vary as shown in the drawing. For this reason, the discriminating device is provided with a monitoring circuit 22 and/or 23 for detecting the voltage variation and/or electric current variation, thereby obtaining the number of the responders by means of the outputs from the monitoring circuit 22 and/or 23. In the drawing, there are shown monitoring circuits 22 and 23 for both the electric current and voltage, but one monitoring circuit may be used for the intended purpose. The outputs from the monitoring circuits are fed to the identifying circuit 24 for being discriminated by means of given discriminating levels, such as for instance, Id or Vd in FIG. 6. As a result, pulse type outputs corresponding to the number of selective switches 20 of the answering devices 201, which switches have been turned to ON, will appear in the identifying circuit 24 as its output. Then, the pulse type outputs are fed to the circuit 25 for being rectified and thereafter fed to the counter circuit 26, such that the number of responders may be indicated on an indicator 27 by means of the outputs from a counter circuit 26. In passing, the discriminating device is provided with a sweep voltage generator 29 enabled by a clock pulse generator 28, and a sweep oscillator 21 is controlled by the saw tooth voltage applied from the generator 29. The output frequency from the sweep oscillator 21 represents only the number of responders as shown in FIG. **6*b* as is clear from the foregoing description, such as in the case with the discriminating device 101,** but it may be possible to add means thereto for identifying who are the responders.

Figure 7:
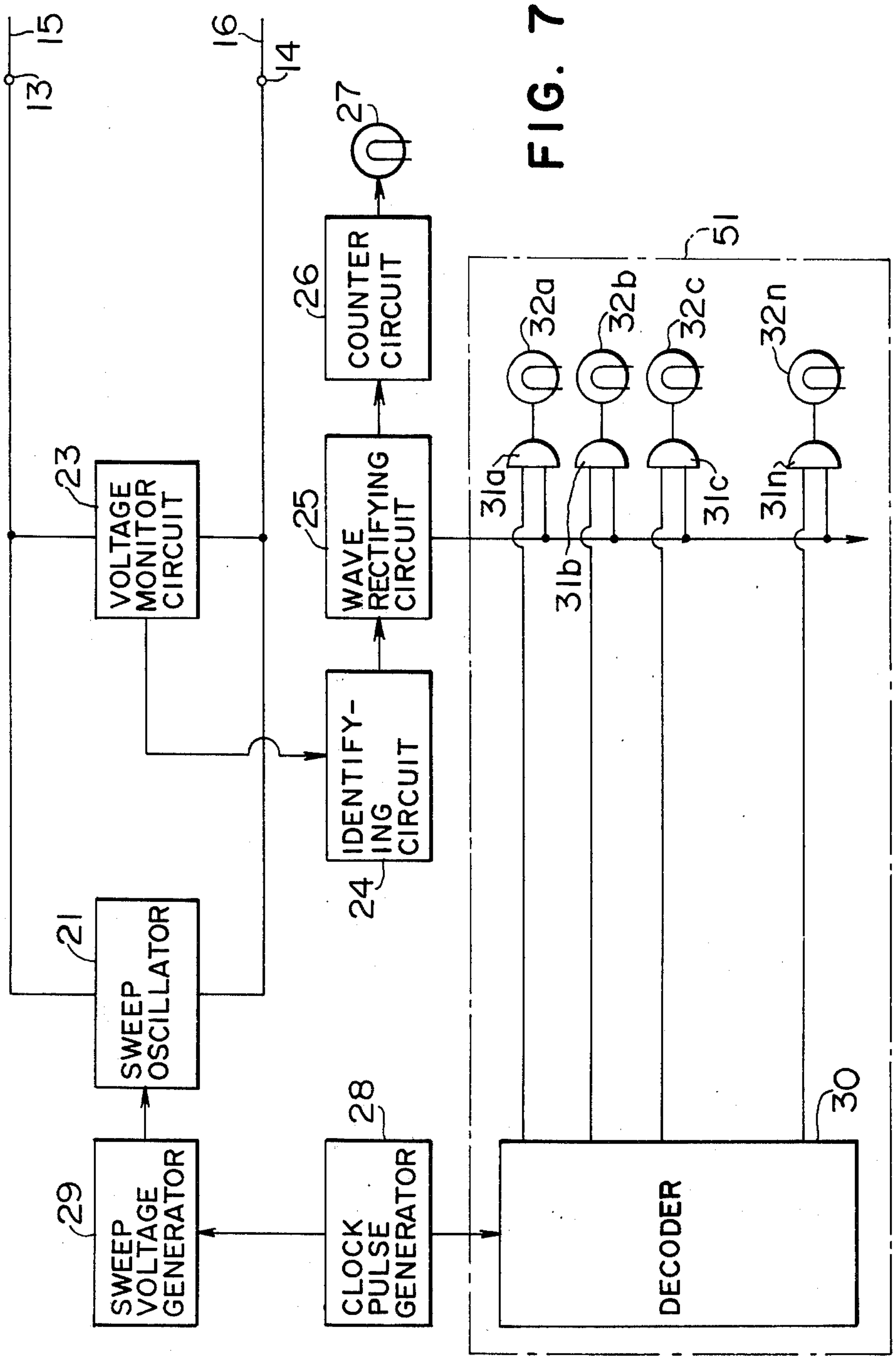
FIG. 7 is a block diagram of the discriminating device, to which is added individual responder discriminating circuit of FIG. 5.

FIG. 7 shows one example of the discriminating device 101 as shown in FIG. 5, to which is added an individual-responder discriminating circuit 51. The reference numerals given in FIG. 7 are similar to those in FIG. 5, but the reference numeral 30 represents a decoder which applies successive ones of the pulses fed from the clock pulse generator 28 to successive AND gates each corresponding to a different answering device. The output from the decoder 30 is added to AND gates **31*a*, 31*b*, 31*c* . . . 31*n*** (*n* is an arbitrary number), coupled with the output fed through a wave rectifyingg circuit 25 from the identifying circuit 24. Accordingly, the simultaneous application of a pulse from the decoder 30 and the output of the rectifying circuit 25 to one of the AND gates **31*a*, *31b*, 31*c* . . . 31*n* will light the one of the individual-responder discriminating lamps 32*a*, 32*b*, 32*c* . . . 32*n*** *(n* is an arbitrary number) which corresponds to the answering device which caused the impedance variation indicated by the output of rectifying circuit 25.

Figure 8:
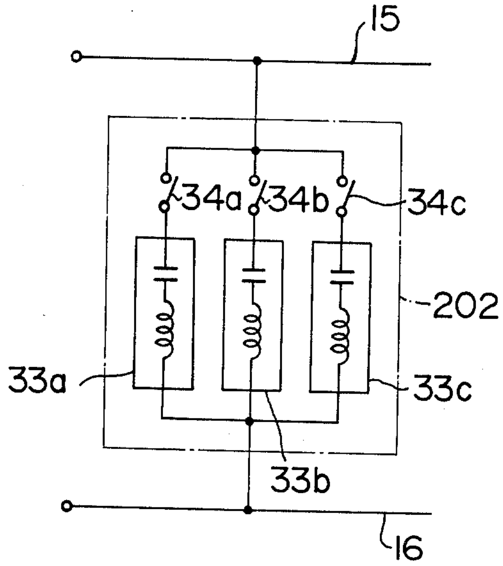
FIG. 8 is a circuit diagram showing answering devices somewhat different from those shown in FIG. 4.

FIG. 8 shows answering devices, in which the principle of the answering devices 201 shown in FIG. 4 is applied to the multi-branch system. The answering devices are provided with a plurality of series circuits **33*a*, 33*b*, 33*c* connected in parallel to each other between the lines 15 and 16, said resonance circuits each including selective switches 34*a*, 34*b*, and 34*c*. In this respect, there are shown three channels in the drawing, but any number of channels may be used. The resonance circuits 33*a*, 33*b*, 33*c* each represent a respective channel and have resonance frequencies distributed within the frequency range allotted to each channel. In this case, only one answering device 202 is shown in the drawing, but other answering devices are constructed in a similar manner to that shown therein. Like the answering devices shown in FIG. 4, the answering devices 202** have mutually different resonance frequencies within the frequency range of the respective channel.

Figure 9:
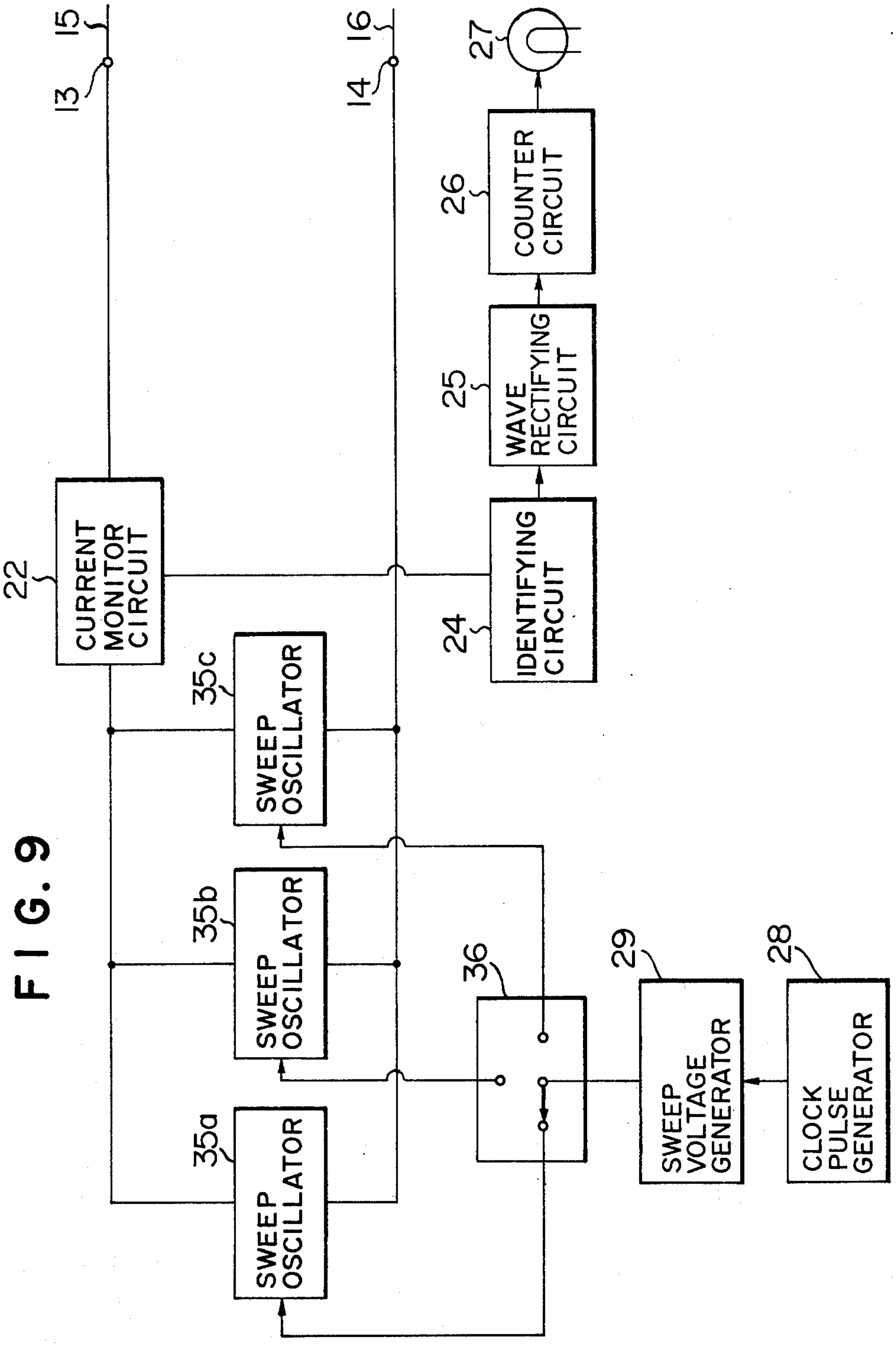
FIG. 9 is a block diagram suited for use with answering devices shown in FIG. 8.

FIG. 9 illustrates a discriminating device for use with the answering devices shown in FIG. 8. The discriminating device 202 is provided with a plurality of sweep oscillators **35*a*, 35*b*, 35*c* corresponding to each channel, and the device 202 is similar to the discriminating device 101 shown in FIG. 5, except for the additional switching means 36 provided between the sweep oscillators 35*a*, 35*b*, 35*c* and the sweep voltage generator 29. It should be noted that the reference numerals used in common throughout the both figures represent the similar parts. The sweep oscillators 35*a*, 35*b*, 35*c* each have varying ranges which can sweep over the entire range of the frequencies allotted to the corresponding channels, respectively, although there are provided intermediate ranges therebetween so as not to interfere with each other. Like in the previous case, there is provided a sweep voltage generator 29 adapted to be suppressed by the clock pulse generator 28, said generator 29 being adapted to drive a selected one of sweep oscillators 35*a*, 35*b*, 35*c* through a channel switch 36. The outputs from sweep oscillators 35*a*, 35*b*, 35*c* are each impressed through the terminals 13 and 14 to the lines 15 and 16.**

According to the device just described, when the channel switch 36 is actuated to connect with the sweep oscillator **35*a* coresponding to the first channel, then the sweep frequency covering the frequency range allotted to this channel is fed to the lines 15 and 16. In this instance, however, if either one of the plurality of answering devices 202 actuates the selective switch 34*a* of the resonance circuit 33*a* corresponding to the first channel, then there occurs variation in impedance in lines 15 and 16, when the resonance frequency of the resonance circuit 33*a* coincides with the sweep frequency. In this case, even if other answering device actuates the selective switch 34*b* for the resonance circuit corresponding to other channel, there will not occur variation in impedance. This is because the resonance frequency of the resonance circuit 33*b* is not distributed over the range of the sweep frequency for the first channel. On the other hand, in case a plurality of answering devices select the same channel, there will occur off-phasing in impedance, without causing simultaneous resonance phenomenon at the sweep frequencies, because of the different resonance frequencies of these answering devices. Like in the case with the discriminating device 101 as shown in FIG. 5, the variation in the electric current and/or voltage due to the variation in such an impedance may be detected. It is needless to mention that the description of the aforesaid operations may similarly apply to other channels. It should be noted that the individual-responder discriminating circuit 51 shown in FIG. 7 may be added thereto. With the device as shown in this instance, if the numbers of the resonance circuits of the answering devices 202 and the sweep oscillators of the corresponding discriminating devices 103** are increased, then a fairly great number of sweep oscillators may be provided. However, the increase in the number of resonance circuits leads to difficulties in adjusting the distribution of the resonance frequencies. In contrast thereto, according to the present invention, there is provided a device which permits the multibranch selection without increasing the number of resonance circuits. This is embodied in the following example.

Figure 10:
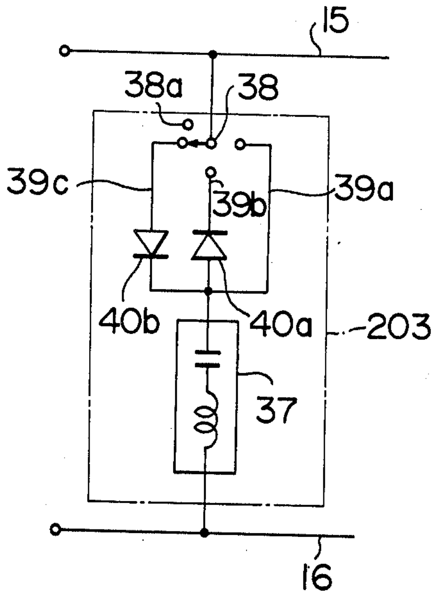
FIG. 10 is a circuit of another example of answering device different from that shown in FIG. 8.
Figure 11:
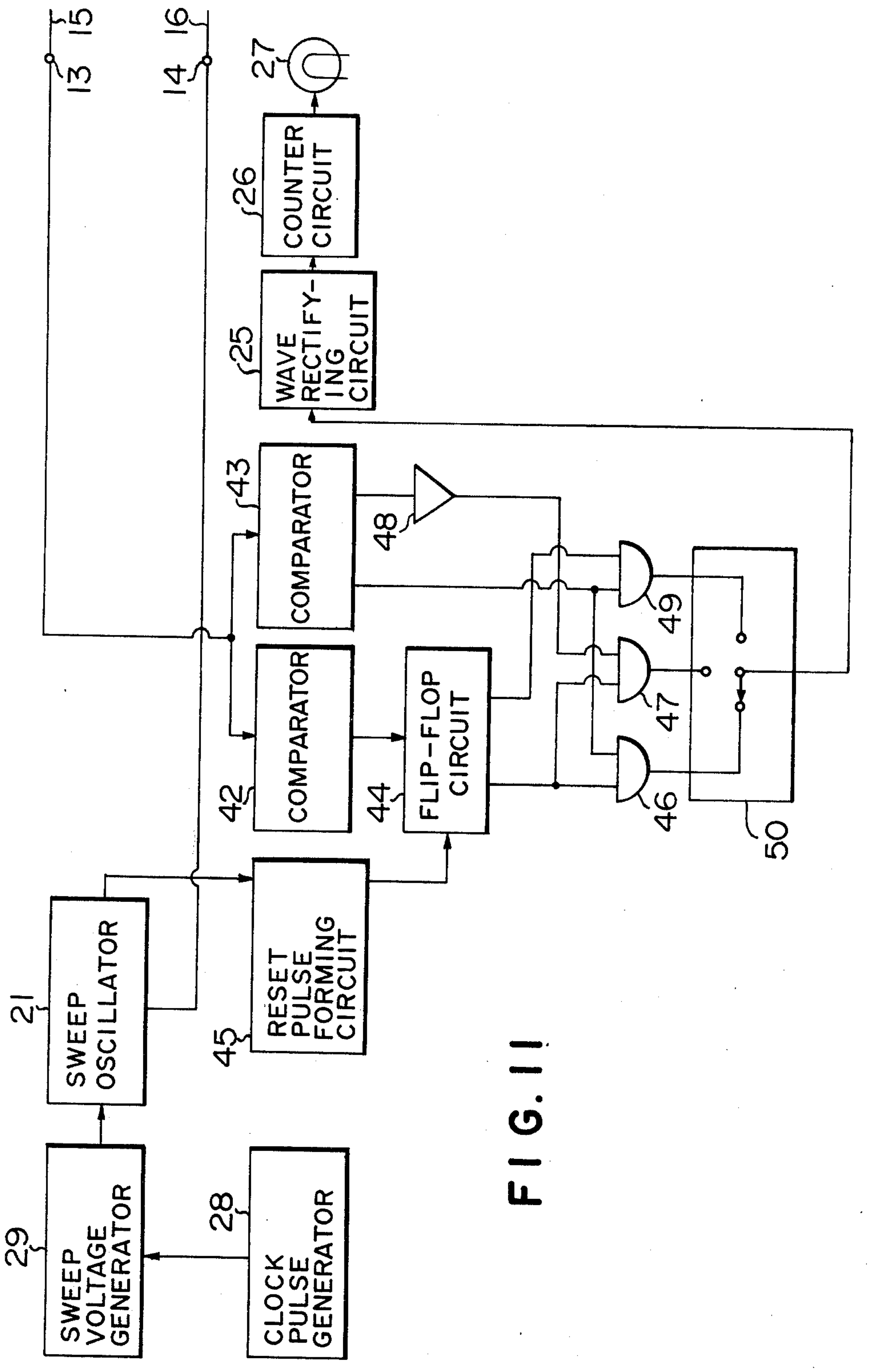
FIG. 11 is a block diagram of the discriminating device suited for use with the answering device shown in FIG. 10.

FIG. 10 shows an answering device 203 of a multi-branch system, which device is somewhat different from that shown in FIG. 8, and a discrimination device 203 for use with this answering device 203 is shown in FIG. 11. The answering device 203 as shown includes a series resonance circuit 37, with the feature that a single resonance circuit 37 is provided and connected with lines 15 and 16 through channel switch 38 and through any one of branches **39*a*, 39*b* and 39*c* which are provided in parallel to each other. In this case, connected to the branches 39***b* and 39*c* corresponding to the second and third channels are diodes 40*a* and 40*b* connected in an opposite polarity relation to each other. Furthermore, the channel selecting switch 38 is provided with an open contact 38*a*. A single answering device is shown in the drawing, but answering devices are of the construction similar thereto, except for the resonance frequency of the resonance circuit 37.

Figure 12A:
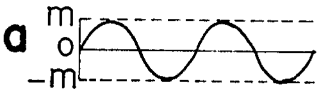
FIGS. 12a–12c are plots showing waveforms indicated on the discriminating device of FIG. 11.
Figure 12B:
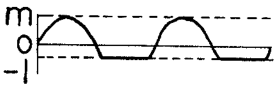
Figure 12C:
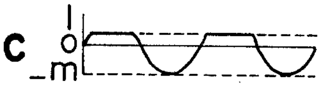

As can be seen from FIG. 11, the discriminating device 203 for use with the answering device 203 is provided with a sweep oscillator 21 similar to that shown in FIG. 5, and the output thereof is fed to the line 16. Likewise, similar reference numerals in FIG. 11 signify the similar parts as shown in FIG. 5. When the switch 38 is actuated to connect with either channel of the answering device 203 for the purpose of sweeping the entire ranges of the mutually different resonance frequencies of answering devices 203, then the resonance circuit 37 will be brought into a conductive condition from resonance phenomenon. In this respect, when the channel switch 38 is connected to the branch 39*a* corresponding to the first channel, a sine wave signal as shown in FIG. 12*a* similar to the output from the sweep oscillator 21 will be generated in the line 15 through the resonance circuit 37. On the other hand, in case the switch 38 is connected with the branch 39*b* corresponding to the second channel, then there will be generated in the line 15 a signal of a wave as shown in FIG. 12*b* due to the effect of the diode 40*a* inserted in the branch 39*b*. Furthermore, in case the switch 38 is connected with the branch 39*c* corresponding to the third channel, there will be generated in the line 15 a signal of a wave as shown in FIG. 12*c* due to the effect of the diode 40*b* inserted in the branch 39*c*. Accordingly, it may be understood that with the answering device 203, there will be generated outputs having different waveforms corresponding to the respective channels. Meanwhile, the reference character $m$ denotes the maximum value of the sin wave, and $-d$ or $d$ denotes the value after the voltage drop due to the diodes 40*a* and 40*b*.

Figure 13A:
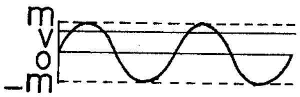
FIGS. 13a and 13b are plots illustrating discriminating levels indicated on the discriminating device of FIG. 11.
Figure 13B:
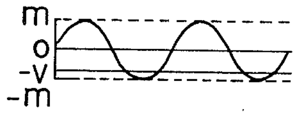

With this embodimentt, as has been described, the mutually different wave forms are detected for discriminating the same. However, in the discriminating device, a signal from the answering device 302 is fed both to a comparator 42 adapted to compare at a given voltage as shown in FIG. 13*a* and to a comparator 43 adapted to compare at a given voltage $-v$ as shown in FIG. 13*b*, wherein the signal is analyzed at the comparators 42 and 43. Meanwhile, when considering the conditions as shown in FIG. 12, the comparing voltage relationship will be as follows:

$$m > v > d$$

or $$-m < -v < -d.$$

In this case, since the comparators 42 and 43 compare sin waves in an opposite voltage relation, the phases at the times of comparison will be different and the output signals will be fed as outputs at the mutually different times. Accordingly, for the purpose of discriminating the signals fed from the answering devices 203 by means of a logical 'and' comparison by combining the outputs from the comparators 42 and 43 together, the output signals from the comparators 42 and 43 should coincide in time with each other.

Figure 14:
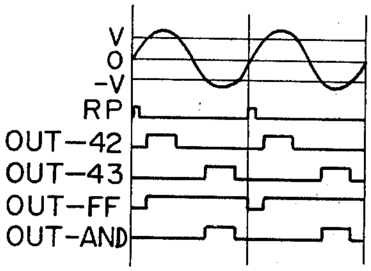
FIG. 14 is a timing chart of several signals indicated on the discriminating device of FIG. 11.

In the case of this discriminating device, the output from the comparator 42 is fed to a flip-flop circuit 44, such that the output from the comparator 42 is retained in the flip-flop circuit until the signal is issued from the other comparator 43. A reset pulse is impressed to the flip-flop circuit 44 from the circuit 45 which is adapted to generate a reset pulse per one cycle of the sin wave produced at the sweep oscillator 21. FIG. 14 shows a timing chart of such output signals, in which PR represents a reset pulse, OUT-42 represents an output of the comparator 42, OUT-43 represents an output from the comparator 43, FF represents an output from the flip-flop circuit 44 and OUT-AND represents an output from the AND circuit, when 'and' the logical of the comparator 43 and comparison flip-flop circuit 44 is taken out. In this discriminating device, the waveform of a signal from the answering device 203 may be discriminated by forming the logical 'and' combination of the outputs from the comparator 43 and flip-flip circuit 44. The first AND gate is so connected as to produce an output signal, only when the answering device 203 is connected with the branch 39*a* corresponding to the first channel, i.e., only when the signal of a waveform as shown in FIG. 12*a* is fed. In other words, connected to the input terminal of the first AND gate 46 are the output from the comparator 43 and the true output from the flip-flop circuit 44. On the other hand, only when the switch 38 is actuated to connect with the branch 39*b* corresponding to the second channel, i.e., only when the signal of a waveform as shown in FIG. 12*b* is fed thereto, the output signal may be produced in the second AND gate 47, whose input terminal is connected to the output, which has been inverted from the output from comparator 43 by an invertor 48, and to the true output from the flip-flop circuit 44. On the other hand, only when the selective branch in the answering device 203 selects the branch 39*c* corresponding to the third channel, i.e., only when the signal of a waveform as shown in FIG. 12*c* is fed, the third AND gate 49 will be connected with the output from the comparator 43 and with the false output from the flip-flop circuit 44.

With the arrangement of the AND gates, pulse-like outputs corresponding to the number of responders who have selected channels corresponding to answering devices, respectively, are produced at the output terminals of the gate circuits 46, 47 and 49, and such outputs are so designed as to be fed through the channel switch 50 to a waveform rectifying circuit 25. Accordingly, when the channel switch 50 is actuated so as to connect with a desired channel, the number of responders may be counted in the counter circuit 26, like in the case with the discriminating device as shown in FIG. 5. Likewise, it is needless to mention that the individual-responder discriminating circuit 51 may be added thereto.

As can be seen from this embodiment, the provision of a single resonance circuit 37 for the respective answering device 203 enables the multi-branch selecting system. However, by utilizing the principle incorporated in the devices as shown in FIGS. 8 and 9, it is possible to provide a plurality of resonance circuits for the answering devices 203 thereof. Thus, a device best suited for the selecting system including more than 10 channels may be provided.

Figure 15:
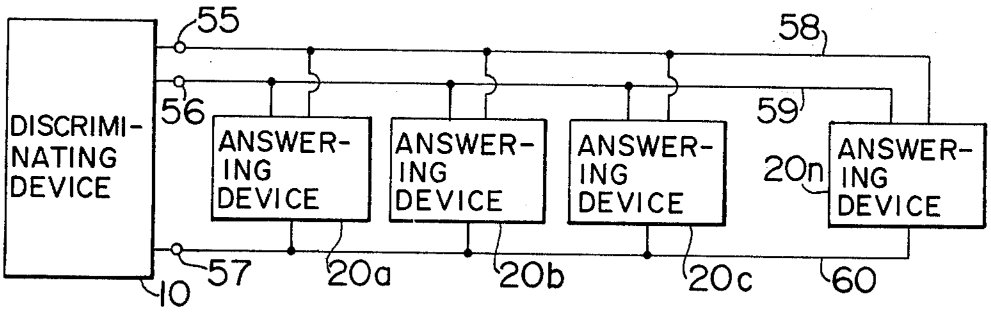
FIG. 15 is a block diagram showing, in a simplified form, another example of the response analyzing device of the present invention.

FIG. 15 shows the arrangement of the response analyzing device according to the present invention, which is different to some extent from that shown in FIG. 3. In this device, however, three terminals 55, 56 and 57 are provided in the discriminating device 10, with the lines 58, 59 and 60 extending therefrom. This embodiment is not different essentially from those shown in FIGS. 4 and 5, although the number of lines shown is not provided in a limitative sense, and thus the number of lines may be increased more than that shown. A plurality of answering devices 20*a*, 20*b*, 20*c* . . . 20*n* (n is an arbitrary number) are connected in parallel to each other between the common line 60 and the individual lines 58 and 59, respectively. Thus, like in the previous case, one answering device 20*a* is connected with the discriminating device 10, and the answering device 20*a* may be bridge connected with the other answering devices 20*b*, 20*c* . . . 20*n*.

Figure 16:
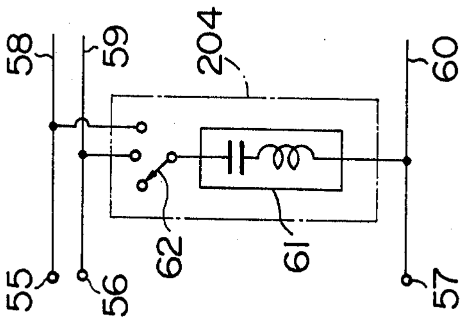
FIG. 16 is a circuit diagram of answering devices shown in FIG. 15.

FIG. 16 shows an anwering device 204 according to the arrangement of FIG. 15. With this answering device 204, the seriesly connected resonance circuit 61 arranged between the common line 60 and the individual lines 58 and 59 is connected with either of the individual lines 58 and 59 through a selective switch 62. In this case, if the number of lines is increased, then the number of contacts may be increased accordingly. Meanwhile, like in the previous case, the resonance frequencies of the resonance circuits 61 are different from each other with respect to the answering devices.

Figure 17:
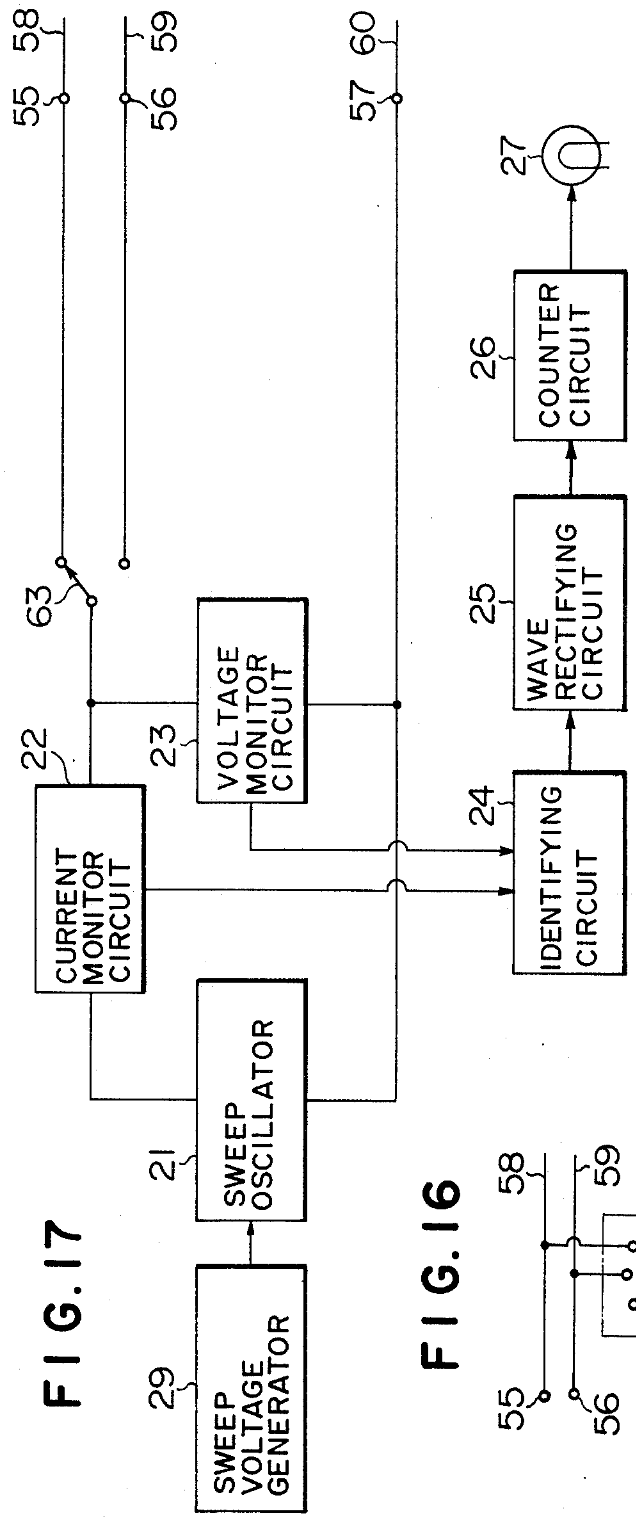
FIG. 17 is a block diagram of the discriminating device shown in FIG. 15.

FIG. 17 shows one example of the discriminating device, wherein the answering device as shown in FIG. 17 is used according to the arrangement of FIG. 15. The similar reference numerals shown therein designate the similar parts to those shown in FIG. 5.

As is clear from the comparison of FIG. 17 with FIG. 15, the only difference is that there is provided another channel switch 63 so as to impress the output from the sweep oscillator 21 to either of the individual lines 58 and 59. It may be understood that, by doing this, such may be readily utilized for the multi-selective system.

It will be understood that the above description is merely illustrative of preferred embodiments of the present invention. Additional modifications and improvements utilizing the discoveries of the present invention can be readily anticipated by those skilled in the art from the present disclosure, and such modifications and improvements may fairly be presumed to be within the scope and purview of the invention as defined in the claims that follow.

What is claimed is:

1. A response analyzing device comprising:

a plurality of answering devices each comprising a series resonant circuit and a selection switch in series with said resonant circuit and operable to an open and a closed condition for responding to a question, and wherein the resonance frequencies of the resonant circuits in said plurality of answering devices are mutually different;

a pair of lines electrically connecting in parallel the series combinations of the resonant circuit and selection switch in each of said plurality of answering devices; and a master unit comprising a sweep frequency oscillator for applying an oscillatory output signal, having a frequency continuously varying over a frequency range within which the resonance frequencies of said series resonant circuits lie, to said pair of lines connecting the parallel combination of the resonant circuit and selection switch in each answering device of said plurality of answering devices, and means for detecting variations in the impedance of the parallel combination of the resonant circuits and selection switches in said answering devices across said pair of lines and which are effected by the closure of ones of said selection switches, whereby the detected impedance variations are representative of the responses made with said answering devices.

2. A response analyzing device according to claim 1, wherein said means for detecting comprises means responsive to the voltage developed across the parallel combination of the resonant circuits and selection switches for developing a pulse when the voltage exceeds a certain level, and means for counting the pulses.

3. A response analyzing device according to claim 1, wherein said sweep frequency oscillator is enabled by external clock pulses, and further comprising a clock pulse generator for developing a sequence of clock pulses to enable said oscillator, a plurality of two input AND gates each having a first input connected for receiving the output of said means for detecting, a decoder for applying successive clock pulses to the second input of successive ones of said AND gates, and a plurality of indicators each enabled by the output of a respective one of said AND gates whereby each indicator corresponds to one of said answering devices and indicates when the select switch of the corresponding answering device has been closed.

4. A response analyzing device according to claim 1 wherein: each of said answering devices comprises a plurality of series resonant circuits, and selection switch means in series with said plurality of series resonant circuits and operable for switching selected ones of said resonant circuits in and out of the parallel combination of resonant circuits connected in parallel by said pair of lines, each resonant circuit in each of said answering devices having a resonance frequency falling within a respective one of a plurality of non-overlapping frequency bands defining different channels, and each of the resonant circuits having mutually different resonance frequencies within each channel.

5. A response analyzing device according to claim 4, comprising a plurality of sweep frequency oscillators each operable for applying an oscillatory output signal, having a frequency continuously varying over a frequency range of a respective one of said channels, to said pair of lines connecting in parallel the combination of the resonant circuits and said selection switch means in each answering device.

6. A response analyzing device according to claim 1: wherein each of said answering devices comprises said resonant circuit, waveshaping means in series with said resonant circuit for shaping the signal developed across said resonant circuit, in response to the signal applied by said sweep oscillator, according to certain selectable wave shapes, and selection switch means operable for selecting the wave shape effected by said wave-shaping means, each of said resonant circuits having mutually different resonance frequencies, and each of the different wave shapes designating different channels; and wherein said master unit further comprises channel discriminating means operable for discriminating signals having a particular wave shape to discriminate between the different channels.

7. A response analyzing device according to claim 6, wherein said wave-shaping means comprises a pair of diodes each connected in series between said resonant circuit and said selection switch means and having opposite relative polarities, and wherein said selection switch means comprises a switch operable for connecting said resonant circuit and a selected one of said diodes across said pair of lines for shaping the signal developed across said resonant circuit by clipping either the positive or negative part of the signal in accordance with which of said diodes is selected.

8. A response analyzing device according to claim 6, wherein said channel discriminating means comprises: a pair of comparators each connected to compare the amplitude of the signals developed across the parallel combination of resonant circuits connected by said pair of lines for respectively determining if the signals are greater than a certain positive value or less than a certain negative value, a flip-flop circuit connected to receive an output from a first of said comparators to be set thereby, an inverter circuit connected to invert the output of the second of said comparators, a first AND gate connected to receive an output of said flip-flop circuit and an output of said inverter circuit for indicating when one of the channels is selected, and a second AND gate connected to receive an inverted output of said flip-flop circuit and an output of the second comparator for indicating when the other channel is selected.

9. A response analyzing device according to claim 1, further comprising: a third line, and wherein each of the resonant circuits in the respective answering devices are connected to a first of said lines, and wherein each of the selection switches in the respective answering devices is operable for connecting the respective resonant circuits to one or the other of the remaining two lines for indicating a response to a question, and wherein said master unit further comprises switch means operable for applying the output of the sweep oscillator to a selected one of said remaining two lines and for connecting said means for detecting impedance variations across said first line and the selected one of said remaining two lines.

* * * * *